(12) United States Patent  
Greenstein et al.

(10) Patent No.: US 7,327,271 B2
(45) Date of Patent: Feb. 5, 2008

(54) PORTABLE WEATHER DETECTOR AND ALERT SYSTEM

(76) Inventors: Lawrence Tibor Greenstein, 1825 Edgemont St. #2, Los Angeles, CA (US) 90027; Jay Bruce Ross, 287 S. Main St., Unit #11, Lambertville, NJ (US) 08530

( * ) Notice: Subject to any disclaimer, the term of this patent is extended or adjusted under 35 U.S.C. 154(b) by 137 days.

(21) Appl. No.: 10/848,988

(22) Filed: May 19, 2004

(65) Prior Publication Data

US 2005/0258971 A1 Nov. 24, 2005

(51) Int. Cl.
*G01W 1/00* (2006.01)
(52) U.S. Cl. .................. 340/601; 340/600; 340/602; 340/525; 340/539.28; 340/690; 700/21; 700/79; 324/72
(58) Field of Classification Search ................ 340/601, 340/600, 602, 539.28, 525, 690; 324/72; 700/21, 79, 2
See application file for complete search history.

(56) References Cited

U.S. PATENT DOCUMENTS

| | | | | |
|---|---|---|---|---|
| 4,812,825 A | * | 3/1989 | Kennedy et al. | 340/601 |
| 6,164,130 A | * | 12/2000 | Pabst et al. | 73/170.24 |
| 6,177,873 B1 | * | 1/2001 | Cragun | 340/601 |
| 6,232,882 B1 | * | 5/2001 | Hed et al. | 340/601 |
| 6,310,554 B1 | * | 10/2001 | Carrell | 340/601 |
| 6,351,218 B1 | * | 2/2002 | Smith | 340/601 |
| 6,960,995 B2 | * | 11/2005 | Parker et al. | 340/525 |
| 2003/0197616 A1 | * | 10/2003 | Karamanian et al. | |

* cited by examiner

*Primary Examiner*—Hung Nguyen
(74) *Attorney, Agent, or Firm*—Howison & Arnott, L.L.P.

(57) ABSTRACT

A portable weather detection and alarm device includes an electromagnetic signal receiver that receives digital time signals and atmospheric phenomenon signals. A processor connected to the electromagnetic signal receiver processes the atmospheric phenomenon signals to determine when an atmospheric event has occurred. An alarm connected to the processor that indicates the occurrence of an atmospheric event.

48 Claims, 5 Drawing Sheets

PORTABLE WEATHER DETECTOR AND ALERT SYSTEM

TECHNICAL FIELD OF THE INVENTION

This invention is related to an atmospheric phenomenon detection system, in particular a portable electronic weather detection and alert system.

BACKGROUND OF THE INVENTION

The dissemination of information regarding weather-related events has dramatically increased during recent years with the advent of high-quality satellite and radar imaging systems the increased ability to accurately forecast future weather events and the proliferation of personal communication devices. Hikers, bicyclists, campers, building contractors and others may depend on real-time weather information in planning outdoor activities and responding to sudden changes in weather conditions.

Currently, some weather information is broadcast over a special weather radio signal on the VHF band, ranging between 162.400 and 162.550 MHZ, which is outside the normal AM and FM broadcast bands. This special radio signal is provided by the National Oceanic and Atmospheric Administration (NOAA). Special weather radios must be used in order to receive these types of weather broadcasts. Weather messages are repeated every 4 to 6 minutes and are routinely updated every one to six hours, or more often when rapidly changing weather conditions are present. The weather broadcasts may also include severe weather warnings that pose a threat to life and safety.

Another type of weather warning system is provided by Data Transmission Network Corporation (DTN) of Omaha, Nebr. In this system, emergency weather information is sent directly to an alpha-numeric pager. Information such as weather watches, warnings and storm movement in a user's area, and local weather updates are broadcast twice daily for an eight-county area. Severe weather watches and warnings, dense fog advisories, winter storm watches and warnings, highway watches and warnings, freezing precipitation advisories, and avalanche bulletins are available in alpha-numeric format. In addition, an audible alarm may also be provided on the pager to signal certain weather events.

One dangerous atmospheric phenomenon is lightning. Lightning includes electrical discharges within a cloud, intracloud (IC) discharges, and cloud to ground (CG) discharges (total lightning). Lightning occurs when electrical fields within a cloud intensify as particles of opposite polarity collect at differing regions within the cloud. Typically, the electric field forms as a result of strong updrafts which carry monopolar positive charge aloft leaving negative space charge in a central or lower part of the cloud. Precipitation and downdrafts can also transport negative space charge downward. The updrafts and downdrafts further contribute to the electrification of the cloud particles. Lightning generally occurs near the location of these intense updrafts and downdrafts.

Lightning begins with an initial electrical breakdown (pulse) followed by leader channels from which a series of channel branches grow within a cloud forming a comprehensive branch channel structure. For IC lightning, the channel structure remains within the cloud. A CG discharge occurs when one or more branches extend from a cloud to the ground. The leader channel propagates in steps to the ground. When the leader channel is about 100 meters from the ground, a streamer propagates up from the ground to meet the stepped leader. When the two meet, a continuous channel of ionized air is formed from the cloud to the ground. At this point a large current flows from the ground to the cloud which is known as a return stroke.

Typical lightning detection systems, such as the Lightning Location and protection (LLP) system used in the National Lightning Detection Network (NLDN), operate to detect CG return strokes. Generally, the return stroke associated with a CG discharge is many times larger than for IC discharges. This type of system typically will not detect IC lightning. The system may assign a location to the discharge corresponding to a position on the ground. The system may not provide any information respecting to the stroke origin which may be tens of miles distant.

Single sensor systems have an inherent susceptibility to RF noise. Since Very Low Frequency (VLF) signals are targeted for detection, systems for detecting CG return strokes can provide a general bearing of a storm using well known crossed loop technology, but are subject to gross errors with respect to distance. In particular, single sensor VLF systems determine the distance of a lightning stroke from the stoke intensity, but stroke intensities can vary by two or three orders of magnitude. Thus it will be appreciated that these VLF systems do not have the capability to accurately determine lightning range from a single observation station.

Weather detection systems often suffer from display limitations with respect to lightning position. More particularly, a single dot on a display typically represents a complete lightning flash. However, a lightning flash can extend for tens of kilometers from an initial leader. Thus a display of dots may provide a general area containing lightning discharges, but does not provide an accurate representation of the location of the source of the atmospheric disturbance. The source of the lighting is generally the area presenting the most severe aviation hazards, such as hail, icing, turbulence and microbursts.

A still further drawback of some systems is that in operation, the systems detect and process energy from many parts of the lightning channels of lightning strokes and the multitude of pulses from each stroke, thus requiring a tremendous processing capability. Such systems are complex and expensive.

Weather phenomena have been observed over a very long period of time by systems involving a plurality of measuring stations, which communicate their data to a center(s). From the measured data, the movements of air masses are determined and weather forecasts prepared. This known method has, however, a series of disadvantages. For example, the accuracy of the analysis of the movements of air masses is dependent not only on the type of measuring instruments, but also on the number and distribution of measuring stations. On the high seas, no measuring stations are located in the near—and often not even in the wider—vicinity from which data concerning the expected or even the prevailing weather may be obtained. The data obtained by satellites may be received only be expensive installations, and satellites by and large provide only data for broad spaces, which for travel on the high seas are inadequate and largely inaccurate. Furthermore, the frequency of readings at the measuring stations and their processing (in view of the enormous amounts of data involved) is relatively low so that up-to-date weather reports may be issued at long time intervals only.

A VLF weather detection system may include a process for the monitoring of weather phenomena by means of the analysis of the movements of air masses. These movements of air masses are determined by receiving the electromagnetic radiation generated in the atmosphere in the VLF range between 3 kHz and 100 kHz by means of a directionally selective radio receiving installation, dividing the received radiation into at least two noncontiguous frequency bands, determining the event frequencies occurring within the noncontiguous frequency bands separately from each other, comparing the event frequencies with standardized event-correlated values, and displaying the results in at least two stages. This process is suitable for the analysis of weather phenomena to a distance of approximately 500 km from a given location (the far range).

With respect to known VLF single station lightning detection systems, there are considerable limitations associated therewith due to the inherent variation in lightning stroke discharge amplitudes. For example, a lightning channel structure includes a tremendous horizontal and vertical span radiating energy throughout. This produces polarization errors for azimuth and distance determination. Lightning discharges vary in intensity as much as three orders of magnitude, thus precluding accurate distance determination based on detected discharge intensity. Also, IC and CG discharges have different characteristics.

Often during thunderstorms, intense downdrafts, known as microbursts, follow lightning producing updrafts. Microbursts pose a threat to aircraft, especially immediately after take off and prior to landing where an aircraft is especially vulnerable. A further danger to aircraft results as a microburst approaches ground level and air flows horizontally creating a wind shear region possibly resulting in stalling the aircrafts and losing lift. In fact several hundreds of deaths have occurred in airplane crashes over the past few decades due to intense downdrafts, or microbursts and resulting wind shear.

Since lightning generally begins near the locations of intense updrafts and downdrafts, the early detection of microbursts is critical in averting such disasters. This situation has been partially addressed by the Federal Aviation Administration (FAA) which has responded by situating weather radars, such as Terminal Doppler Weather Radars (TDWR), at various major airports across the United States. These radars measure the radial velocity of raindrops towards and away from the radar and infer air motions therefrom.

However, despite the considerable cost, in the neighborhood of several millions of dollars, Doppler weather radars have limitations. For instance, if rainfall is vertical and the radar is scanning near the horizon, no radial velocity is detected, thus not detecting a possible downdraft. Doppler radars operate to detect outflow air having rain drops therein. Further disadvantages of weather radars are slow volume scans, for example up to three minutes to obtain one picture, performance degradations due to ground clutter, and significant cost.

Known lightning detection systems do not provide a way to determine potential microburst locations since there is no known correlation between CG discharges and microbursts. It will be appreciated by one skilled in the art that a VLF system detecting signals having wavelengths on the same scale as lightning channels is not well adapted for microburst prediction which requires defining lightning in scales of hundreds of meters. A VLF system detects a CG return stroke emitting VLF energy having a wavelength in the order of 10 kilometers, but can rarely, if at all, detect the shorter stepped structure of IC lightning rich in HF and VHF radiation from which microbursts can be predicted.

Other technologies are currently being developed and exist to detect windshear conditions, such as laser, Infra Red (IR) and Doppler radar based systems. While those technologies may be successful in ascertaining microbursts that have already developed, it is unlikely that event prediction will be attainable. Hazardous weather warnings would be in the vicinity of a few minutes, or seconds, and thus possibly not sufficient for an aircraft to avoid the danger.

Therefore, there is a need for a portable weather detection and alarm device having the ability to detect lightning, tornados, hurricanes and other dangerous atmospheric conditions in the field.

SUMMARY OF THE INVENTION

The present invention disclosed and claimed herein, in one aspect thereof, comprises portable weather detection and alarm device includes an electromagnetic signal receiver that receives digital time signals and atmospheric phenomenon signals. A processor connected to the electromagnetic signal receiver processes the atmospheric phenomenon signals to determine when an atmospheric event has occurred. An alarm connected to the processor that indicates the occurrence of an atmospheric event.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
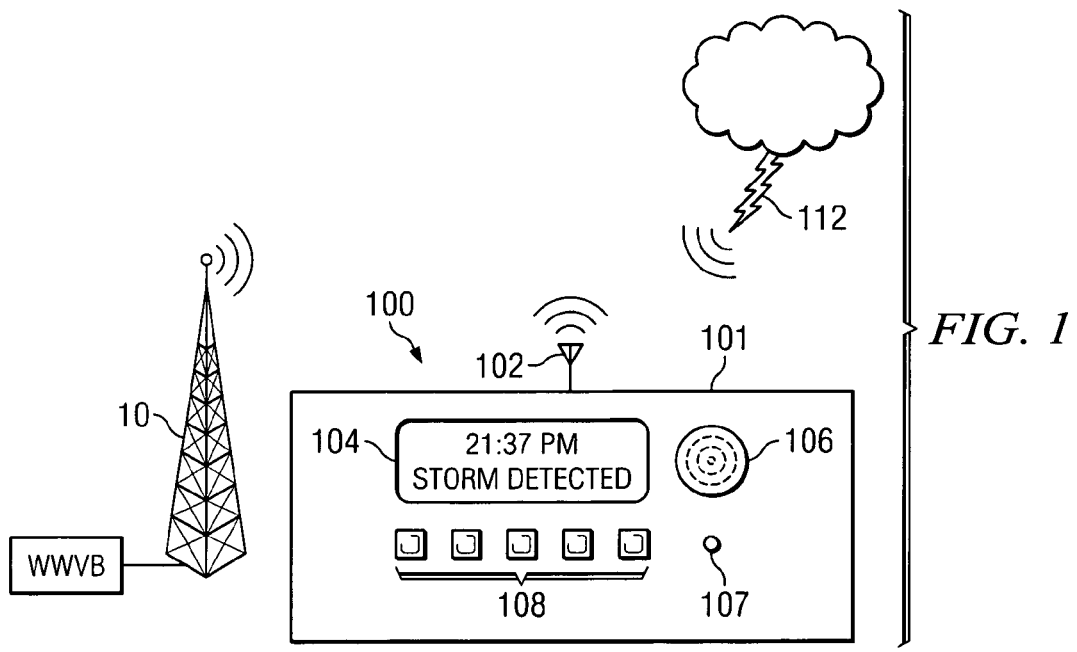
FIG. 1 illustrates a portable weather detection and alarm system.

Referring now to the drawings, wherein like reference numbers are used to designate like elements throughout the various views, several embodiments of the present invention are further described. The figures are not necessarily drawn to scale, and in some instances the drawings have been exaggerated or simplified for illustrative purposes only. One of ordinary skill in the art will appreciate the many possible applications and variations of the present invention based on the following examples of possible embodiments of the present invention.

With reference to FIG. 1, a portable weather detector and alert system in accordance with one embodiment is shown. A portable alert device 100 may include a suitable portable alert device housing 101, typically made of plastic. In accordance with the disclosed embodiment, the portable alert device housing 101 may be about the size of a standard pager, about two inches by three inches by one half inch. Like a pager, the portable alert device may be small enough to fit in a pocket or clip to a belt. It will be recognized by those skilled in the art that the portable alert device 100 may be fashioned to be larger or smaller, depending on the particular intended use.

Portable alert device 100 may include a receiving antenna 102 to facilitate the reception of radio signals or other electromagnetic signals. Antenna 102 may typically be formed of a ferromagnetic substance, metallic wire or other electrically conductive substance. The receiving antenna 102 may be formed, in material, configuration or a combination, with heightened sensitivity to 60 kHz radio waves. While antenna 102 is shown as a primarily external antenna, in some embodiments the antenna 102 may be disposed entirely or partly within the housing 101 of portable alert device 100.

The portable alert device 100 may include a visual display 104 such as a liquid crystal display or light emitting diodes. Other forms of visual display devices may be used to provide visual information as suitable. In an embodiment where only simple information is communicated by the portable alert device 100, the visual display 104 may include one or more light emitting diodes or a single line alpha-numeric liquid crystal display. Other embodiments may display detailed information including the time, temperature, barometric pressure as well as status and alert messages. Multi-line alpha-numeric visual displays may be implemented to simultaneously display information. Color displays or two-tone displays including graphical bit-mapped data may be implemented. Visual display 104 may be a touch-screen display and function as an input device 108 as well. A battery indicator LED 107 may be used to indicate a sufficient or low battery condition.

The portable alert device 100 may include a sound generator 106 to generate audible signals, voice messages and alarms. Typically, the sound generator 106 may be a speaker, although other forms of sound generators like bells or whistles could be used. The sound generator 106 may generate noises, tones, tonal sequences, verbalized notices or other appropriate sounds.

The portable alert device 100 may include one or more manual input devices 108. The manual input devices 108 may include buttons, switches, dials, a touch-screen display or other suitable input devices. Typically, a button or switch may operate to turn the portable alert device 100 into an ON state and an OFF state. Parameters and other configuration settings may be defined using the manual input devices 108. The manual input devices 108 may be used to set the time zone, manually setting the time, muting an alarm function and enabling various levels of alarm activity. Volume for the audible signal generator 106 may be set using the manual input devices 108.

The portable alert device 100 receives radio signals from a transmitter 110. In accordance with the disclosed embodiment, the transmitter 110 transmits time data on the 60 kHz band. The transmitter 110 may be a WWVB transmitter, operated by the National Institute of Standards and Technology (NIST).

WWVB is a national radio station under the auspices of the NIST that continuously broadcasts time and frequency signals at 60 kHz. The carrier frequency provides a stable frequency reference traceable to the national standard. There are no voice announcements on the station, but a time code is synchronized with the 60 kHz carrier and is broadcast continuously at a rate of 1 bit per second using pulse width modulation. The carrier power is reduced and restored to produce the time code bits. The carrier power is reduced 10 dB at the start of each second, so that the leading edge of every negative going pulse is on time. Full power is restored 0.2 seconds later for a binary "0," 0.5 seconds later for a binary "1," or 0.8 seconds later to convey a position marker. The binary coded decimal (BCD) format is used so that binary digits are combined to represent decimal numbers. The time code contains the year, day of year, hour, minute, second, and flags that indicate the status of Daylight Saving Time, leap years, and leap seconds.

The portable alert device 100 may simultaneously receive radio signals from storm activity 112. In accordance with the disclosed embodiment, the portable alert device 100 receives any 60 kHz signals generated by lightning, hurricanes, tornados or other severe atmospheric phenomenon. Because the electromagnetic signals produced by atmospheric phenomenon tend to be aperiodic, they can be distinguished from the WWVB broadcast, electrical interference and other man-made signals. By detecting changes in the frequency and intensity of the storm-generated signals, the approach of the storm can be determined.

Figure 2:
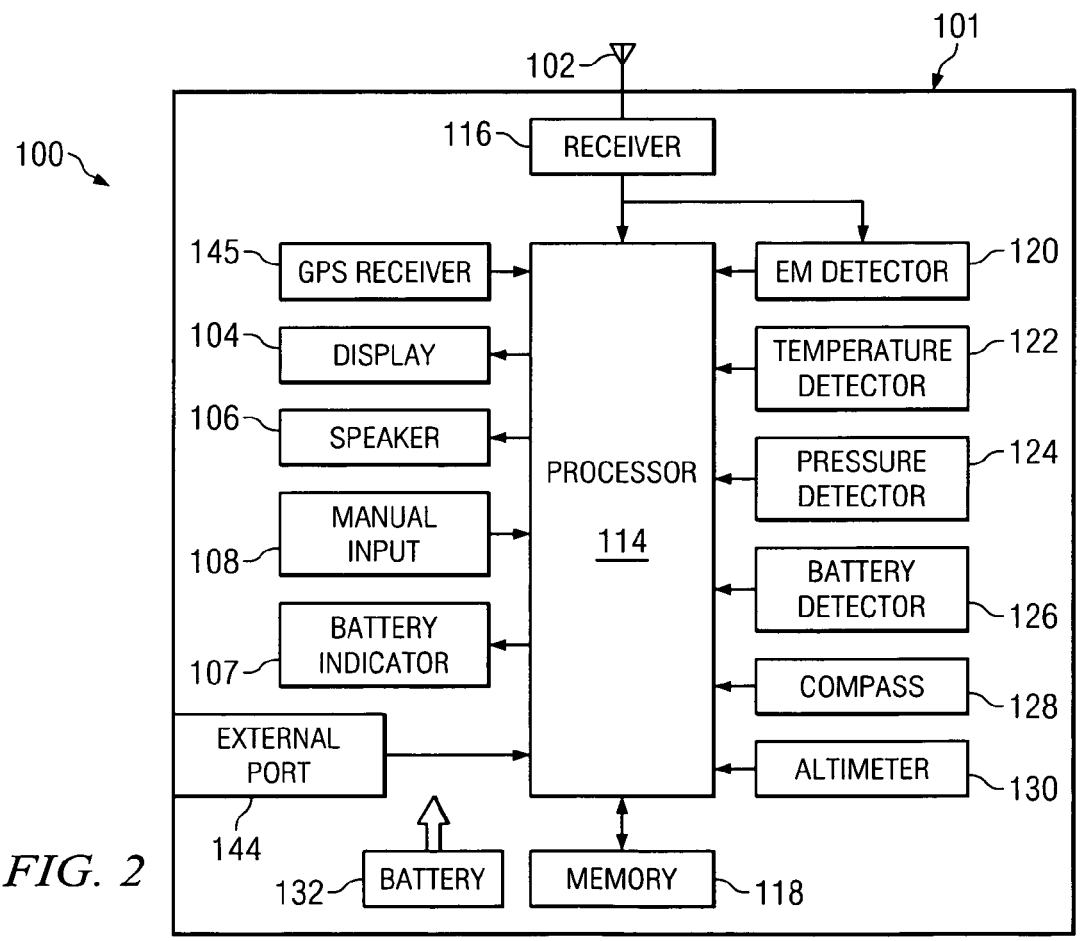
FIG. 2 illustrates a functional block diagram of a portable weather detection and alarm device.

With reference to FIG. 2, a functional block diagram of a portable alert device 100 is shown. The circuitry, sensors, input devices, output devices and power source are typically housed within a portable alert device housing 101. In accordance with other embodiments, one or more components may be disposed external to the portable alert device housing 101.

A electromagnetic-signal receiver 116 may be connected to antenna 102. In accordance with the disclosed embodiment, the receiver 116 receives radio signals at or near the 60 kHz band. The WWVB time signals are transmitted at 60 kHz. The WWVB signals provide accurate time data to the portable alert device 100. Electromagnetic signals from atmospheric phenomenon may be received at 60 kHz. It will be recognized by those skilled in the art that other frequencies may be suitable or preferred. The choice of frequency may depend on the transmission frequency of transmitter 110 and the frequency of suitable signature electromagnetic signals produced by storms 112. The receiver 116 may also receive audible radio signals, such as NOAA weather radio signals. The audible radio signals may be played over speaker 106, providing audible weather information to the user. In accordance with one embodiment, a separate receiver may be provided to receive the audible radio signals.

Receiver 116 outputs a digital signal to processor 114. Typically, receiver 116 may include an analog-to-digital convertor to convert the analog radio signals into digital signals. In another embodiment, a separate A/D converter may receive analog signals from the receiver and output associated digital signals to the processor 114. The processor 114 receives and processes the digital time signals. These digital time signals may be translated into a display format and presented visually on display 104 connected to processor 114.

The digital signal may be received by an electromagnetic detector 120. The electromagnetic detector 120 may be integrated with the processor 114 as electromagnetic signal detection software component or may be implemented as an independent component as shown. The electromagnetic detector 120 detects electromagnetic pulses and differentiates storm-generated signals from the time signals modulated by transmitter 110. Because other man-made radio signals may be received, the electromagnetic detector 120 identifies any periodic or near-periodic signals, or any other signals which have a specified signature. This identification function may be performed by the processor 114, even where the electromagnetic detector 120 is a separate component. In accordance with the disclosed embodiment, the electromagnetic detector 120 may detect pulses that occur on the 60 kHz frequency band.

The electromagnetic detector 120 may include a programmable threshold detector. The programmable threshold detector may be implemented as a hardware circuit or as a software function, typically implemented as firmware. The programmable threshold detector may be programmed with an intensity threshold. The intensity threshold establishes the intensity level of received signals that will be detected. By setting the intensity threshold to zero, any signal detected by the electromagnetic detector 120 will be communicated to the processor 114. By setting an intensity threshold greater than zero, the portable alert device 100 will only acknowledge electromagnetic signals received that have a power level greater than the set threshold. The intensity threshold defines the sensitivity of the portable alert device 100. The sensitivity setting functions to permit detection of atmospheric phenomenon proximity or intensity.

The processor 114 may be connected to a temperature detector 122. Typically, a thermoresistor that changes resistance with changes in temperature is used to detect the ambient temperature. Other types of thermometers may be used as suitable. A temperature signal is output from the temperature detector 122 to the processor 114.

The processor 114 may be connected to a pressure detector 124. Typically an air pressure detection circuit is used to detect the barometric pressure. A barometric pressure signal is output from the pressure detector 124 to the processor 114. Typically, the processor 114 calculates the first derivative of the barometric pressure data to determine the rate of change of the barometric pressure data. Rate of change of barometric pressure may be an indicator of storm conditions.

The processor 114 may be connected to a battery detector 126. The battery detector 126 is typically connected to a battery 132 which supplies power to each electrical component in the portable alert device 100 that requires power. Battery 132 may be a standard 9 volt battery. The battery detector 126 may detect a low power condition in the battery output. The battery detector 126 may determine the life expectancy of the remaining power in the battery 132. The battery detector 126 outputs a battery status signal to the processor 114. An AC power supply or other appropriate power source may be used to supply power to each electrical component in the portable alert device 100. Where an AC power supply is provided, battery 132 may be provided as a back-up power source.

The processor 114 may be connected to a compass 128. The compass 128 detects the direction of magnetic north and outputs a direction signal to the processor 114. A direction display may be displayed on visual display 104.

The processor 114 may be connected to an altimeter 130. The altimeter 130 detects the altitude of the portable alert device 100 and outputs an altitude signal to the processor 114. An altitude display may be displayed on visual display 104.

The processor 114 will typically be connected to one or more memory devices 118. The memory devices 118 may include RAM for storing data during processing, ROM for storing programming or other data, flash memory or other non-volatile memory devices.

The processor 114 may be connected to a visual display 104, a speaker 106, one or more manual input devices 108 and a battery indicator 107. These input and output devices allow the user to communicate with the portable alert device 100 and receive information from the portable alert device 100. An external port 144 may be connected to the processor. The external port 144 may be connected to a computer, PDA, cellular telephone or other digital device. The portable alert device 100 may download data from a digital device using the external port 144, or may upload data to a digital device using the external port 144. Control or status data may be transmitted using the external port. Other input or output devices may be implemented as suitable.

The processor 114 may be connected to a global positioning system (GPS) receiver 145. The GPS receiver 145 receives global positioning signals from a global positioning system, providing absolute location data for the portable alert device 100. The received location data may be displayed on the visual display 104.

Figure 3:
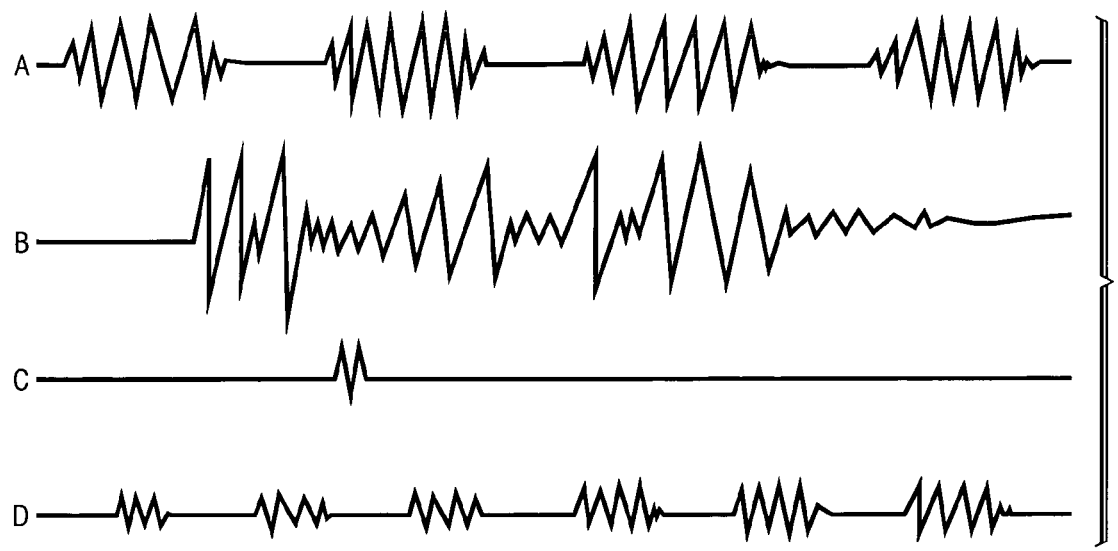
FIG. 3 illustrates typical electromagnetic signals received by the portable weather detection and alarm device.

With reference to FIG. 3, several graphs representing possible electromagnetic signals that may be detected by the portable alert device 100 are shown. Graph A shows a periodic signal such as transmitted by transmitter 110. These signals typically have time data modulated on them. The modulated time signals are received by the receiver 116 and decoded to provide digital time signals to the processor 114. These digital time signals may be displayed on the visual display 104, providing the user with an accurate clock.

Graph B shows an aperiodic burst that may be formed by atmospheric phenomenon such as a storm 112. Typically, the energy distribution of this aperiodic burst is random in both magnitude and duration. When this type of signal is received by the receiver 116 and detected by the electromagnetic detector 120, the data is correlated with other data, such as the temperature and changes in barometric pressure to determine the likelihood of nearby storm activity and potentially the type of storm activity.

Graph C shows an aperiodic man-made signal that may be generated by a non-recurring event like a garage door opener or the start of a machine. Typically, the energy distribution of this aperiodic burst is regular in magnitude and short in duration. When this type of signal is received by the receiver 116 and detected by the electromagnetic detector 120, the signal is rejected as being man-made.

Graph D shows a period man-made signal that may be generated by a transmitter, motor, electronic device or other man-made electrical system. When this type of signal is received by the receiver 116 and detected by the electromagnetic detector 120, the signal is rejected as being man-made.

Figure 4:
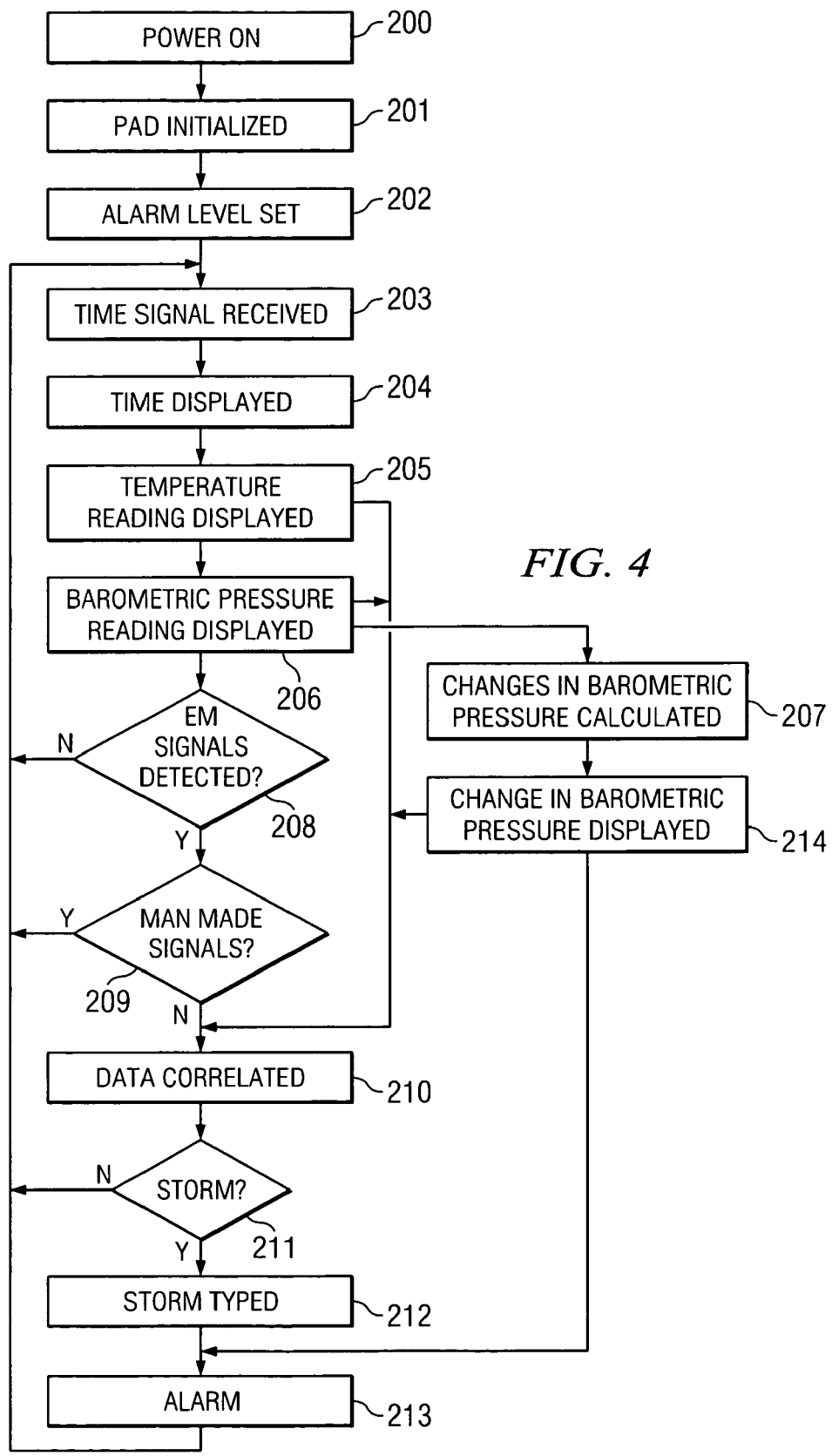
FIG. 4 illustrates a flow chart of a weather detection and alarm process.

With reference to FIG. 4, a flow chart for the operation of the portable alert device 100 is shown. The power to the portable alert device 100 is switched on in function block 200. The portable alert device is initialized in function block 201. The initialization process may include loading software and stored data into the processor 114 from the memory 118 for execution.

The alarm level of the portable alert device 100 is set, either by loading the alarm level setting from memory or prompting the user to enter an alarm level in function block 202. The alarm level setting determines what type of alarm will be sounded in response to various atmospheric phenomenon. For example, different cadences may be played in response to an electrical storm, a tornado or a hurricane. Alternatively, some atmospheric phenomenon may not warrant an alarm signal and so might be set OFF.

The time signal transmitted by transmitter 110 is received by receiver 116 and sent to processor 114 in function block 203. The time signal is translated into an appropriate format and displayed on visual display 104 in function block 204.

A reading from the temperature sensor 122 is translated into an appropriate format and displayed on visual display 104 in function block 205.

The barometric pressure is read by the pressure detector 124 and translated by the processor into an appropriate format for display on visual display 104 in function block 206. The rate and sign of changes in the barometric pressure are calculated by the processor 114 in function block 207. The change in barometric pressure may be displayed in function block 214 as an indication of a severe storm. Where the change in barometric pressure indicates a severe weather condition, an alarm may be sounded in function block 213.

The electromagnetic detector 120 detects incoming radio signals at 60 kHz, subtracting out the expected time signal transmissions. At decision block 208, the process determines if incoming radio signals are detected. If no signals have been received, the process follows the NO path and returns to function block 203 for continuing reception of the time signals.

If electromagnetic signals have been detected, the process follows the YES path to decision block 209. The process determines if the received electromagnetic signals are man-made in decision block 209. If the received electromagnetic signals are typical of man-made signals, the process follows the YES path and returns to function block 203 for continuing reception of the time signals. If the received electromagnetic signals are atypical of man-made signals, the process follows the NO path to function block 210.

The temperature reading at function block 205, the barometric pressure reading at function block 206 and the changes in barometric pressure at function block 207 may be correlated with the signature of the electromagnetic signals at function block 210 to identify characteristic storm data. The process continues to decision block 211 where the processor 114 determines if a storm has been identified.

If the data is not characteristic of storm activity, the process follows the NO path and returns to function block 203 for continuing reception of the time signals. If the data is characteristic of storm activity, the process follows the YES path and proceeds to function block 212 where the type of storm is identified. In function block 213, an alarm of the type associated with the storm activity by the alarm settings is sounded. The process then returns to function block 203 for continuing reception of the time signal.

The life of the battery 132 may be extended by periodic shut-down of the portable alert device circuitry. When the processor 114 indicates that there is little possibility of storm activity, the portable alert device may be put into a reduced power mode, where only certain functions remain active, or may power down entirely for a period of time, turning back on to check for a change in storm potential. When the processor 114 indicates that there is a potential for storm activity, the power may be left on for longer periods of time. When the processor 114 indicates that storm activity is likely or present, the power remains on until key indicators suggest that it is safe to return to a power cycling mode.

Figure 5:
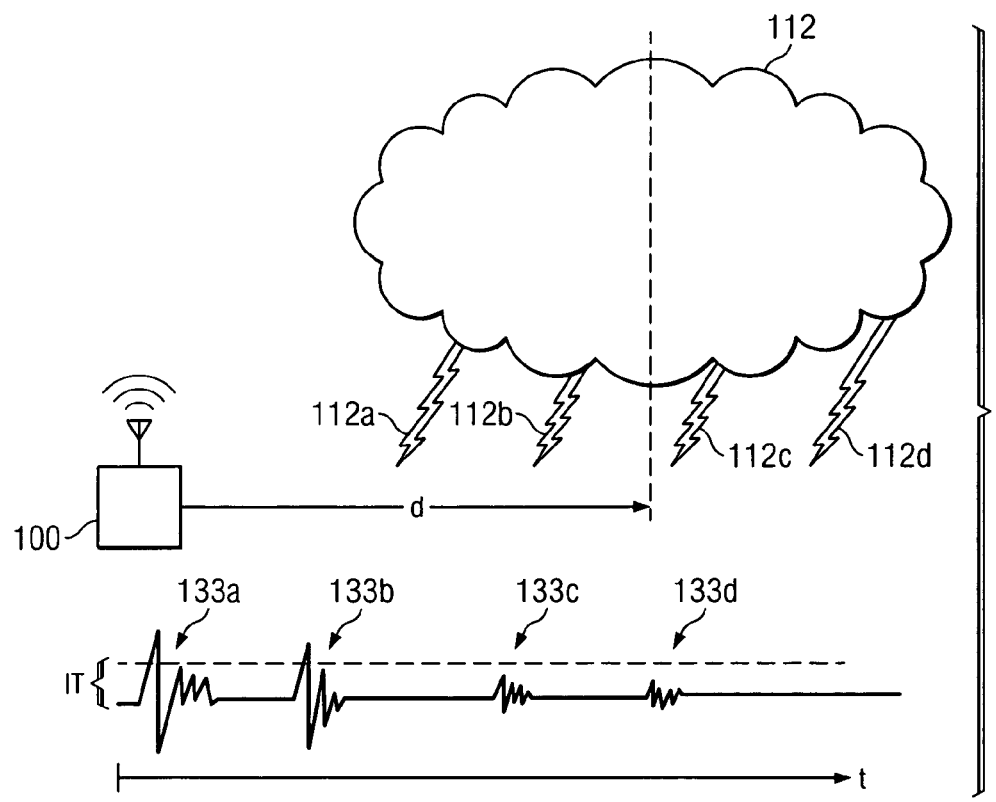
FIG. 5 illustrates intensity detection by the portable weather detection and alarm device.

With reference to FIG. 5, an intensity detection by the portable weather detection and alarm device 100 is shown. A storm 112 may stretch over many miles. Given a series of lightning strikes of approximately the same intensity 112a, 112b, 112c and 112d, the portable weather detection and alert device 100 may be set to detect only lightning strikes within a predetermined proximity d. Each lightning strike 112 is an electromagnetic event, such that the bolt 112a may be depicted as a received electrical pulse 133a, bolt 112b as pulse 133b, bolt 112c as pulse 133c and bolt 112d as pulse 133d. Because the power of the received pulse diminishes with distance, the intensity threshold setting IT may be set so that the electromagnetic detector 120 only detects pulses 133a and 133b. As the storm 112 moves closer to the portable weather detector and alert device 100, more lightning strikes are detected. An increase in the frequency of the lightning strikes may indicate that the storm is moving closer to the portable weather detection and alert device 100, while a decrease in frequency of the lightning strikes may indicate that the storm is moving away. By changing the intensity threshold setting IT, the portable weather detection and alert device 100 may pick up more distant storms or only alert the user to storms that are immanent, as desired.

Figure 6:
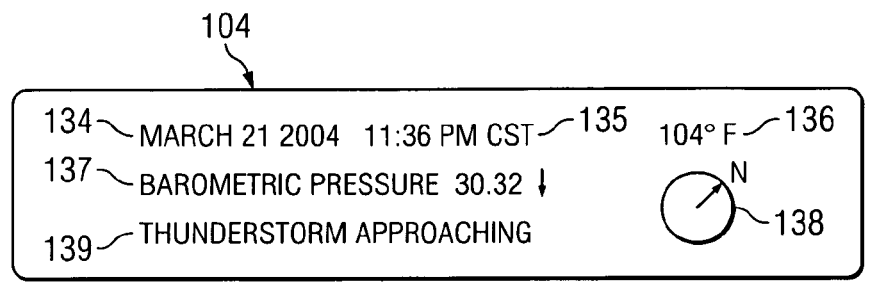
FIG. 6 illustrates a typical portable weather detection and alert display.

With reference to FIG. 6, a typical display 104 is shown. The display 104 may be a liquid crystal display capable of displaying alphanumerics and graphical images. The display 104 may show the date 134 and the current time 135 as received from the WWVB broadcast. The display 104 may display the present temperature and scale 136 as detected by thermometer 122. The display 104 may display the current barometric pressure 137 as detected by the barometer 124, including an indication showing whether the barometric pressure is rising, falling or remaining steady. Display 104 may also show the rate of change of the barometric pressure, as desired. The display 104 may include a graphical representation of the direction to magnetic north 138 as detected by the compass 128. The display 104 may include a weather alert 139 as generated by processor 114.

Figure 7:
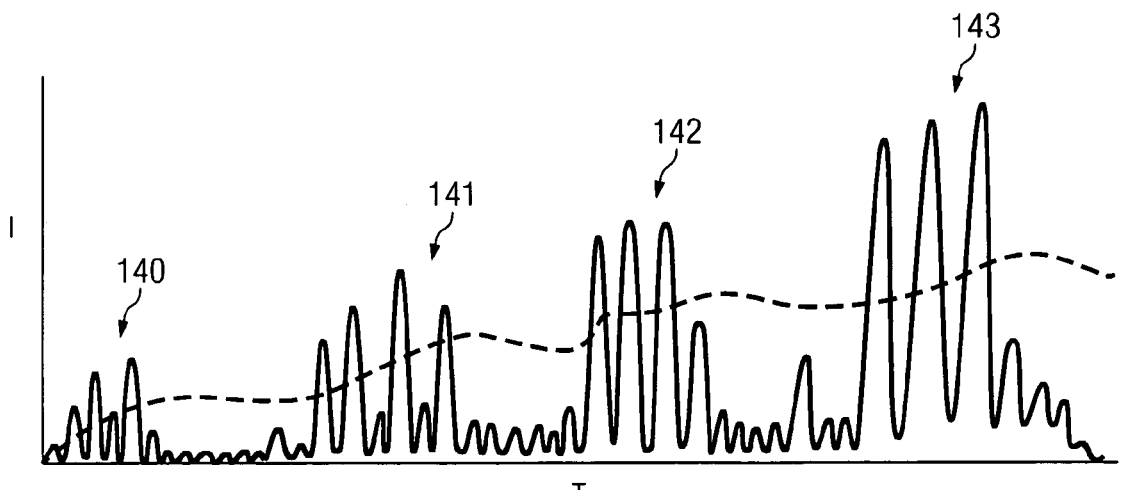
FIG. 7 illustrates a power graph of received electromagnetic signals.

With reference to FIG. 7, a power graph of received electromagnetic signals corresponding to atmospheric phenomenon is shown. The graph measures time (t) on the X-axis and the intensity (I) of the electromagnetic signals received at 60 kilohertz. The intensity of the electromagnetic signal is proportional to the square of the amplitude of the electric field. As can be seen, the pulses 140, 141, 142 and 143 have increasing intensity. An average intensity 144 may be calculated by the processor. Where the average intensity 144 generally increases over time, the storm may be determined to be approaching. Where the average intensity 144 generally decreases over time, the storm may be determined to be receding.

Figure 8:
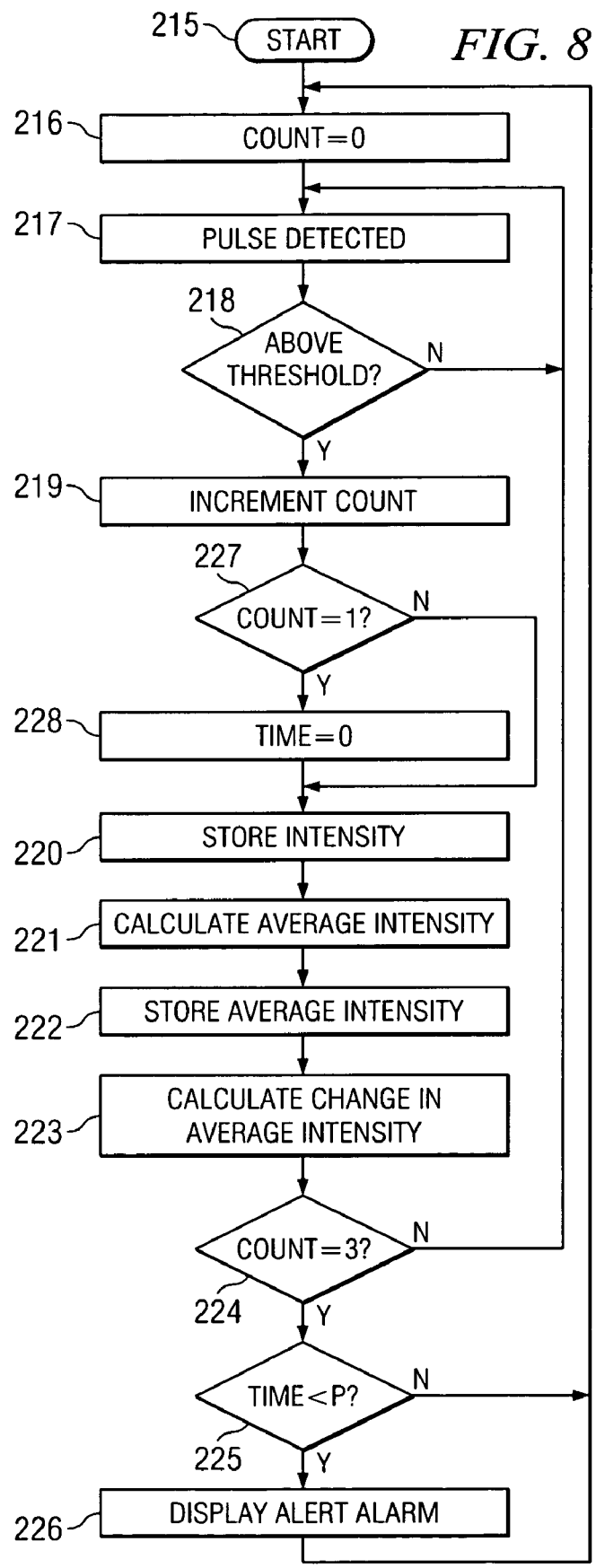
FIG. 8 illustrates a flow chart of a intensity averaging alert process.

With reference to FIG. 8, a flowchart of an average intensity detection process is shown. The process starts at block 215. A counter is set to equal zero at function block 216. The process continues to function block 217 where the process waits until an electromagnetic pulse is detected. When a pulse is detected at function block 217, the process continues to decision block 218 which determines whether the intensity of the pulse is greater than the intensity threshold. If the intensity of the pulse is not above the intensity threshold, the process follows the NO path to function block 217 where the process waits until another pulse is detected. If the intensity of the pulse is above the intensity threshold, the process follows the YES path to function block 219 where the counter is incremented.

The process continues to decision block 227 which determines if the count is equal to one. If the count is equal to one, the process follows the YES path to function block 228 where the time is set equal to zero. The process continues to function block 220. If the count is not equal to one, the process follows the NO path to function block 220.

Function block 220 stores the intensity of the pulse in memory. The process continues to function block 221 where the processor calculates the average intensity of the pulses received since the counter was reset to zero. The process continues to function block 222 where the average intensity is stored in memory. The process continues to function block 223 where the processor calculates the change in average intensity since the counter was reset to zero. If the change in average intensity is positive, the storm is determined to be approaching. If the change in average intensity is negative, the storm is determined to be receding.

The process continues to decision block 224 which determines if the count is equal to three. If the count is not equal to three, the process follows the NO path and returns to function block 217 to wait for another pulse. If the count is equal to three, the process follows the YES path to decision block 225 which determines if the elapsed time since the first pulse was received is less than some predetermined threshold. If the elapsed time is greater than the predetermined threshold, the process follows the NO path and returns to function block 216 where the counter is reset to equal zero. If the elapsed time is less than the predetermined threshold, the process follows the YES path to function block 226 where an alert is displayed and an alarm is sounded, depending on the configuration settings of the portable weather detection and alert device 100. The process then returns to function block 216 where the counter is reset to zero.

It will be appreciated by those skilled in the art having the benefit of this disclosure that this invention provides a portable weather detection and alarm device. It should be understood that the drawings and detailed description herein are to be regarded in an illustrative rather than a restrictive manner, and are not intended to limit the invention to the particular forms and examples disclosed. On the contrary, the invention includes any further modifications, changes, rearrangements, substitutions, alternatives, design choices, and embodiments apparent to those of ordinary skill in the art, without departing from the spirit and scope of this invention, as defined by the following claims. Thus, it is intended that the following claims be interpreted to embrace all such further modifications, changes, rearrangements, substitutions, alternatives, design choices, and embodiments.

What is claimed is:

1. A portable weather detection and alarm device comprising:
    an electromagnetic signal receiver that receives digital time signals and electromagnetic signals produced by lightning, wherein the digital time signals are transmitted to and received by the electromagnetic receiver at a stable fixed carrier frequency and the electromagnetic signals produced by the lightning are concentrated about the fixed carrier frequency and received at substantially the fixed carrier frequency;
    a processor communicably connected to the electromagnetic signal receiver that processes the received time signals to determine accurate time data for display thereof on a display, and processes the electromagnetic signals produced by lightning to determine when an atmospheric event has occurred, and is operable to distinguish the received electromagnetic signals produced by the lightning from received digital time signals; and
    an alarm connected to said processor that indicates the occurrence of an atmospheric event.

2. The portable weather detection and alarm device of claim 1 further comprising a display connected to said processor.

3. The portable weather detection and alarm device of claim 1 wherein said electromagnetic signal receiver receives electromagnetic signals at a frequency of about 60 kilohertz.

4. The portable weather detection and alarm device of claim 1, wherein said electromagnetic signal receiver receives digital time signals at a frequency of about 60 kilohertz.

5. The portable weather detection and alarm device of claim 1, wherein said electromagnetic signal receiver receives electromagnetic signals and digital time signals at a frequency of about 60 kilohertz.

6. The portable weather detection and alarm device of claim 1, wherein said processor discriminates man-made electromagnetic signals from electromagnetic signals produced by lightning.

7. The portable weather detection and alarm device of claim 1, wherein said processor detects the frequency of noise bursts to determine the approach of atmospheric phenomenon.

8. The portable weather detection and alarm device of claim 1, wherein said processor detects the intensity of noise bursts to determine the approach of atmospheric phenomenon.

9. The portable weather detection and alarm device of claim 6 wherein said discrimination is based on signal aperiodicity.

10. The portable weather detection and alarm device of claim 1, further comprising a barometric pressure sensor connected to said processor.

11. The portable weather detection and alarm device of claim 10 wherein said processor receives barometric pressure signals from said barometric pressure sensor and said processor measures changes in barometric pressure and uses said changes in barometric pressure to determine when an atmospheric event has occurred.

12. The portable weather detection and alarm device of claim 10 wherein said processor receives barometric pressure signals from said barometric pressure sensor and said processor uses said barometric pressure signals to determine when an atmospheric event is likely to occur.

13. The portable weather detection and alarm device of claim 1 further comprising a battery sensor connected to said processor.

14. The portable weather detection and alarm device of claim 1 wherein said processor determines when atmospheric events are unlikely and said processor periodically causes said portable weather detection and alarm device to power off when atmospheric events are unlikely.

15. The portable weather detection and alarm device of claim 14 wherein said portable weather detection and alarm device remains powered when said processor determines that atmospheric events are not unlikely.

16. The portable weather detection and alarm device of claim 1, wherein said alarm is an audible signal.

17. The portable weather detection and alarm device of claim 1, wherein said alarm is a visual indicator.

18. The portable weather detection and alarm device of claim 1, wherein said processor determines the type of atmospheric event that has occurred and the alarm indicates the type of atmospheric event.

19. The portable weather detection and alarm device of claim 1 further comprising a temperature sensor connected to said processor.

20. The portable weather detection and alarm device of claim 19 further comprising a display connected to said processor wherein said display visually indicates a temperature signal received by the processor from said temperature sensor.

21. The portable weather detection and alarm device of claim 1, further comprising an altimeter connected to said processor.

22. The portable weather detection and alarm device of claim 1, further comprising a compass connected to said processor.

23. The portable weather detection and alarm device of claim 1, further comprising an external port connected to said processor.

24. The portable weather detection and alarm device of claim 23, wherein said external port provides connection between the processor and a digital device, such that data may be communicated from the digital device to the processor.

25. The portable weather detection and alarm device of claim 24, wherein said digital device is a computer.

26. The portable weather detection and alarm device of claim 24, wherein said digital device is a personal digital assistant.

27. The portable weather detection and alarm device of claim 24, wherein said digital device is a cellular telephone.

28. The portable weather detection and alarm device of claim 1, further comprising a global positioning system receiver connected to said processor.

29. The portable weather detection and alarm device of claim 1, wherein said receiver further receives audible radio signals.

30. The portable weather detection and alarm device of claim 29, wherein said audible radio signals are broadcasts of audible weather information.

31. A weather detection and alarm process comprises the steps of:
  receiving electromagnetic signals and time signals, wherein the time signals are received at a stable fixed carrier frequency and the electromagnetic signals are concentrated about the fixed carrier frequency and received at substantially the fixed carrier frequency;
  discriminating man-made electromagnetic signals from atmospheric event electromagnetic signals caused by lightning;
  distinguishing the electromagnetic signals caused by lightning from the digital time signals; and
  indicating an atmospheric event when atmospheric event electromagnetic signals are received.

32. The weather detection and alarm process of claim 31 wherein said electromagnetic signals are received at a frequency of about sixty kilohertz.

33. The weather detection and alarm process of claim 31 wherein said electromagnetic signals include digital time signals.

34. The weather detection and alarm process of claim 31 wherein said step of discriminating includes determining periodicity of the received electromagnetic signals.

35. The weather detection and alarm process of claim 31 further comprising the step of measuring temporal distribution of electromagnetic signals to determine if an atmospheric phenomenon is approaching.

36. The weather detection and alarm process of claim 31 further comprising the step of measuring changes in intensity of electromagnetic signals to determine if an atmospheric phenomenon is approaching.

37. The weather detection and alarm process of claim 31 wherein said step of indicating is performed using a visual display.

38. The weather detection and alarm process of claim 31 wherein said step of indicating is performed using an audible alarm.

39. The weather detection and alarm process of claim 31 further comprising the step of determining a type of atmospheric phenomenon.

40. The weather detection and alarm process of claim 39 wherein said step of indicating further comprising indicating the type of atmospheric phenomenon.

41. The weather detection and alarm process of claim 31 further comprising the step of measuring barometric pressure.

42. The weather detection and alarm process of claim 41 further comprising the step of measuring the rate of change of barometric pressure.

43. The weather detection and alarm process of claim 41 further comprising the step of indicating the likelihood of an atmospheric event when the barometric pressure has a predetermined value.

44. The weather detection and alarm process of claim 42 further comprising the step of indicating an atmospheric event when the rate of change of barometric pressure has a predetermined value.

45. The weather detection and alarm process of claim 31 further comprising the step of receiving global positioning signals and displaying a location based on the received global positioning signals.

46. The weather detection and alarm process of claim 31, further comprising the step of receiving radio broadcasts and audibly playing the radio broadcasts.

47. The weather detection and alarm process of claim 46, wherein said radio broadcasts are NOAA weather broadcasts.

48. A portable weather detection and alarm device comprising:
  a single electromagnetic signal receiver that receives digital time signals and electromagnetic signals produced by lightning; wherein said receiver is operable to receive said electromagnetic signals and digital time signal at substantially 60 KHz;
  a barometric pressure sensor that detects atmospheric pressure;
  a processor communicably connected to said electromagnetic signal receiver and said barometric pressure sensor, wherein said processor processes said atmospheric pressure and said electromagnetic signals produced by lightning to determine when an atmospheric event has occurred, and wherein said processor creates an alarm threshold based on dynamic weighting of both atmospheric pressure and said electromagnetic signals, said processor operable to distinguish the electromagnetic signals produced by lightning from the received digital time signals for display on a display of information related to the received digital time signal; and
  an alarm connected to said processor that indicates the occurrence of an atmospheric event.

* * * * *